Sept. 26, 1967  E. A. KNOWLTON ET AL  3,343,442

VIBRATION DAMPING FASTENER

Filed Aug. 13, 1965

Inventors:
Edward A. Knowlton &
Henry W. Patterson Jr.,
by Philip E. Parker Att'y.

United States Patent Office 3,343,442
Patented Sept. 26, 1967

3,343,442
VIBRATION DAMPING FASTENER
Edward A. Knowlton, Winchester, and Henry W. Patterson, Jr., Stow, Mass., assignors to United-Carr Incorporated, Boston, Mass., a corporation of Delaware
Filed Aug. 13, 1965, Ser. No. 479,369
3 Claims. (Cl. 85—70)

This invention is generally concerned with improved fasteners for mounting articles on supporting panels which are available from one side only; and more particularly, with a vibration damping fastener for mounting articles on or adjacent an apparatus subject to vibration. Further, the invention represents an improvement over previously known vibration damping fasteners such as that disclosed by D. H. Bratton in Patent No. 3,014,563, issued Dec. 26, 1961.

An object of the invention is to provide a simple, inexpensive, easily fabricated fastener which combines effective holding power with good vibration damping characteristics.

Another object of the invention is to provide a fastener which can be readily mounted in an apertured supporting panel which is available at one side only.

A still further object of the invention is to provide a vibration damping fastener wherein the male (bolt) member, of a male and female (nut) fastener combination, is combined with a sleeve of resilient, vibration damping material to make up the novel fastener component.

An additional object of the invention is to provide a fastener which effectively seals the aperture in a panel on which it is mounted.

A further object of the invention is to provide a vibration damping fastener having a built-in feature designed to automatically control the extent of deformation of the resilient sleeve when a co-operating female fastener is applied to the male fastener member.

A still further object of the invention is to provide a vibration damping fastener which is readily secured using automatic attaching tools in that it is generally more expedient to separately feed female fastener members from an impact gun than it is to feed a separate male or bolt fastener member, which was unnecessary with previously known vibration damping mounts.

Other objects and advantages of the invention will become evident from a reading of the following detailed description in conjunction with a viewing of the accompanying drawings in which.

Figure 1:
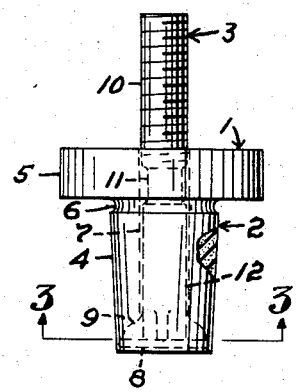
FIG. 1 is a side elevation of the vibration damping fastener.
Figure 2:
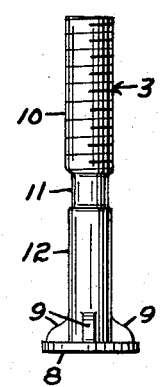
FIG. 2 is a side elevation of the bolt shown in FIG. 1.
Figure 3:
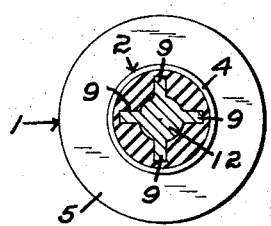
FIG. 3 is a section taken on line 3—3 of FIG. 1.

The vibration damping fastener 1 consists of a resilient sleeve 2 of an elastomeric material, for example, polyurethane rubber, and a metal bolt 3 embedded in one end of the sleeve and extending beyond the other end of the sleeve.

The resilient sleeve 2 includes a generally circular body portion 4, an outwardly extending circumferential flange 5, and a neck portion 6 integrally joining the body portion to the flange. The body portion 4 is gradually inwardly tapered between the neck portion and the end of the sleeve remote from the flange. The sleeve has an internal passage 7 which is closed at the lower end of the body portion and open at the flanged end.

The metal bolt 3 includes a head 8, a shank extending from the head, and a plurality of spaced fins 9 extending between one end of the shank and the head. The shank is comprised of three sections; namely, an upper threaded portion 10, an intermediate, somewhat narrower unthreaded neck portion 11, and a lower, unthreaded portion 12 adjacent the head 8.

The assembly of the vibration damping mount 1 is accomplished using an open cavity mold. The elastomeric material in a liquid state is poured into the mold and the bolt 3 is thereafter placed in the molten solution with the head 8 adjacent the bottom of the mold cavity. The elastomeric material is then cured and the assembled fastener ejected from the mold. To prevent the resilient material from adhering to the shank of the bolt, a spacer sleeve, which is later removed, may be placed over the shank of the bolt during the molding operation. In the alternative the shank of the bolt may be coated with wax or any other suitable release agent which will inhibit the bonding of the sleeve material to the bolt shank.

From a further viewing of FIG. 1 it is readily observed that the resilient material of the sleeve flows around the head 8 of the bolt and in between the spaced fins 9, such that in the finished product the last-mentioned portions of the bolt are actually embedded in the body portion of the sleeve 2. Thus the bolt is precluded from turning relative to the sleeve when an anchoring fastener is applied thereto, as will be more fully explained hereinafter.

For certain applications it has been found to be desirable to vary the hardness of the material from which the sleeve is fabricated to provide improved vibration damping and to more securely retain the bolt head in the sleeve. Thus, for example, in fabricating the illustrated mount, polyurethane rubber having a hardness of 90 durometer may be first poured into the mold cavity up to the level of the top of the fins 9 and thereafter, material of a 60 durometer hardness may be used to complete the sleeve. The harder material will thus encapsulate the bolt head and fins to prevent the bolt from turning or being pulled through the sleeve when a nut is applied to the shank, and the softer material renders the remainder of the body readily deformable and provides for improved vibration damping and sealing in the flange 5. Further if it is desirable, depending on the application, the flange, neck portion, upper body, and lower body portions of the sleeve may each be molded from a single material or different materials having varying degrees of hardness.

Figure 4:
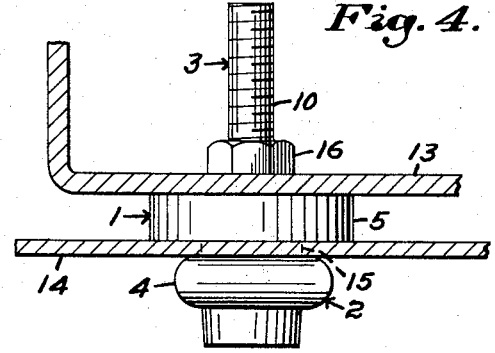
FIG. 4 is a side elevation of an installation depicting the vibration damping fastener securing an article to an apertured supporting panel.
Figure 5:
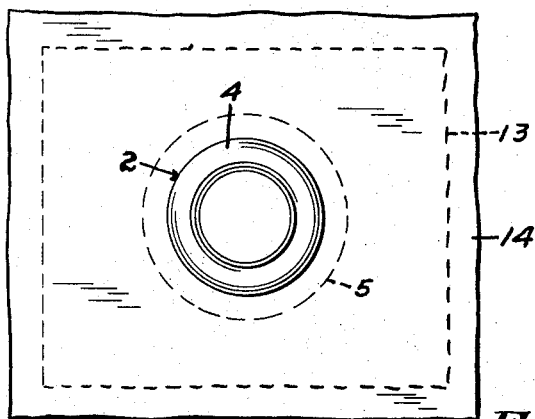
FIG. 5 is a bottom plan view of the installation shown in FIG. 4.

FIGS. 4 and 5 depict an installation wherein the novel vibration damping mount 1 is employed to secure an angle plate 13 to an apertured supporting panel 14. Let us assume for purposes of this discussion that an automobile voltage regulator is mounted on a portion of the angle plate not shown, that support 14 represents a portion of the body of a vehicle beneath its front hood, and that the back or lower side (as viewed in FIG. 4) of support 14 is unavailable at the time of voltage regulator installation or replacement.

The assembly of the plate 13 to the panel 14 is carried out by first pushing the body 4 of the sleeve 2 through the aperture 15 in the panel until the latter snaps into the neck portion 6 of the sleeve 2. Thereafter the exposed portion of the bolt 3 is passed through an appropriately sized hole in the plate 13, and a nut 16 is applied to the threaded portion 10 of the bolt. In the alternative the vibration damping fastener might be initially loosely secured to the plate 13 by the nut 16 and thereafter inserted through the aperture 15 with the plate attached. Regardless of the assembly procedure, as the nut 16 is finally torqued onto the bolt, the body portion 4 of the sleeve 2 is drawn upwardly towards the panel 14;

and, since it cannot proceed back through the aperture 15, expands outwardly forming a bulb of resilient material at the back or underside of the panel 14. Thus, as shown in the drawing, the plate 13 is completely isolated from the support 14 by the resilient, elastomeric material of the flange 5 and the body portion 4 of the now deformed sleeve 2. In addition, the pressing of the rubbery material of the flange and bulb against the surfaces of the panel adjacent the aperture 15 effectively seals the latter, and since the end of the sleeve remains closed, there can be no leakage along the bolt threads and through the passage 7.

The reader will appreciate that the nut 16 can only be torqued onto the bolt 3 until it reaches the narrow neck portion 11, at which point the application of additional torque will only cause it to spin freely. Thus, over-torquing which would cause the sleeve to become twisted or the bolt to be pulled through the sleeve is automatically controlled. Further, by controlling the degree to which the sleeve can be compressed, the likelihood of the resilient material taking a compressive set, which would in turn loosen the fastener, is substantially reduced. For so long as the elastomeric material retains its resiliency and therefore its tendency to return to its original configuration, pressure is maintained on the plate 13 and panel 14 and the desired results of a secure mounting and good vibration damping are obtained.

For purposes of illustration the lower tapered end of the body portion 4 has been shown to be of a harder material than the remainder of the sleeve 2. Thus in FIG. 4 one will observe that the end of the sleeve in which the bolt head is embedded is not distorted and the bolt head is securely retained therein. The use of the hard material also acts as a precaution against the bolt head 8 being forced through the bottom of the sleeve due to excessive force being applied thereto during insertion of the body 4 through the apertured panel 14. However, as previously mentioned, the material of the sleeve 2 may be of a uniform hardness, or different layers of the same or diverse materials of varying degrees of hardness may be employed.

It is also envisioned that the male fastener element 3 might be totally unthreaded or made of a nonmetallic material, for example, the plastic "Delrin." If so modified, a self-threading female fastener may be used in conjunction with the vibration damping mount. In any event it is always the female fastener element which is being separately supplied to facilitate the use of automatic nut feeding and attaching tools.

It is therefore to be understood that what has been disclosed herein represents only a single embodiment of the novel fastener, and it is anticipated that changes, modifications, and improvements may be incorporated therein without departing from the scope of the invention as best defined by the following claims.

We claim:

1. An anchor assembly for securing an article to an apertured support, said assembly having been formed by casting a resilient sleeve about a fastener member and comprising a resilient, hollow sleeve having a body portion adapted to be passed through the aperture in the support, a peripheral flange joined to and extending outwardly from one end of said body portion, and a fastener member having a shank and a head at one end of said shank, said head being securely bonded to the body portion of said sleeve, said shank extending axially through said hollow sleeve and outwardly thereof a predetermined distance beyond said peripheral flange, the portion of said shank within said sleeve being coated with a release agent, said body portion being axially and radially deformable, responsive to the application of a cooperating fastener member to the portion of said shank extending beyond said flange, whereby said body portion forms a bulb at the side of the support remote from said flange, said shank having an intermediate necked portion of smaller diameter than portions of said shank within said sleeve and portions of said shank extending beyond said sleeve, whereby the axial extent to which the cooperating fastener member may be applied to said shank is limited and the extent to which said body portion may be deformed is controlled.

2. An anchor assembly for securing an article to an apertured supporting panel which is available at one side only, comprising a resilient, hollow sleeve having a body portion adapted to be passed through the aperture and an integral peripheral flange extending outwardly from one end of said body portion, said peripheral flange being adapted to resiliently isolate an article from a supporting panel and said body portion being formed from a vibration damping material, a fastening member having a shank and a head at one end of said shank, said head being fixedly engaged to the body portion of said sleeve at the end remote from said flange and having means of preventing rotation of said fastening member relative to said hollow sleeve, said shank extending axially through an axial internal passage in the hollow sleeve and outwardly thereof, a predetermined distance beyond said peripheral flange, said body portion being axially and radially deformable responsive to the torquing of a cooperating fastener member on to a threaded portion of said shank, said shank being partially unthreaded, said unthreaded portion being of somewhat smaller diameter than the threaded portion and having a neck portion adjacent the threaded portion which is smaller in diameter than either said threaded portion or said unthreaded portion, to allow the cooperating fastener member to spin freely thereon, so as to limit the amount the sleeve can be deformed.

3. An anchor assembly according to claim 2 wherein said body portion is formed from a vibration damping material, and portions of said body adjacent the head of said fastener are harder in substance than the remainder of said sleeve to securely retain the fastener therein and to prevent said head from being drawn through the sleeve when a cooperating fastener is torqued onto said shank.

References Cited

UNITED STATES PATENTS

| 1,905,730 | 4/1933 | McIntosh et al. | 85—70 |
| 2,021,176 | 11/1935 | Curtis | 85—70 |
| 2,125,018 | 7/1938 | Hamill | 85—70 |
| 3,014,563 | 12/1961 | Bratton | 85—70 |
| 3,144,805 | 8/1964 | Lee | 85—62 |
| 3,262,352 | 7/1966 | Bedford | 85—70 |

FOREIGN PATENTS

| 188,489 | 1/1957 | Austria. |
| 1,187,316 | 3/1959 | France. |
| 907,899 | 10/1062 | Great Britain. |

CARL W. TOMLIN, *Primary Examiner.*

MARION PARSONS, JR., *Examiner.*